Patented Sept. 22, 1953

2,653,107

UNITED STATES PATENT OFFICE 2,653,107

FUSED REDUCED TITANIA-ZIRCONIA PRODUCT AND METHOD

Warren B. Blumenthal, Niagara Falls, N. Y., assignor to National Lead Company, New York, N. Y., a corporation of New Jersey No Drawing. Application March 30, 1950, Serial No. 153,007

5 Claims. (Cl. 106—57)

The present invention relates to a novel abrasive and attrition resistant product consisting of a fused mixture of partly reduced zirconia and titania and to a method for manufacturing the same.

In many instances, substances rated as "very hard" on any of the accepted hardness scales yield readily to attrition, as for instance, the action of a sand blast. Under such vigorous attack, even silicon carbide, fused aluminum oxide or corundum and certain hardened steels, to mention but a few examples, fail quickly. Although of extreme hardness, they are unsuited for use in those environments where erosive action is severe.

Zirconia has been suggested for use in specific products where hardness is desired; it has been used as an addition agent for certain types of aluminous refractories, and ceramics of fused titania and zirconia have been prepared. Furthermore, other hard products of these metals have been prepared, having relatively high contents of carbon and nitrogen. The latter products, the so-called cyanonitrides, although generally hard crystalline products, ignite in air at elevated temperature, and zirconium cyanonitride burns at red heat to produce finely granular dioxide. Neither the individual oxides of titanium and zirconium, nor ceramic products derived from them, have been found acceptable as abrasive or attrition resistant products of the type contemplated by this invention, nor have the cyanonitrides been found suitable for this purpose.

However, in accordance with the present invention, very hard abrasive particles and attrition resistant products can be prepared from a partially reduced fused composition of titania and zirconia having an oxygen content very considerably higher than that present in the usual cyanonitride and below that found in the dioxides. In the reduced titania-zirconia composition of the present invention, the oxygen content should be greater than 15 weight per cent and less than 98 per cent of that which would be present if no reduction took place.

The attrition resistance of the fused reduced titania-zirconia appears to depend more upon the oxygen content than upon the ratio of the titania to the zirconia since excellent hardness is obtained in fused reduced products with a mol ratio of 1:9 to 9:1 between the titania and zirconia in the initial mix. Somewhat increased attrition resistance is obtained in fused reduced products where the mol ratio of titania to zirconia used in the preparation is between 1:3 to 3:1.

The product of the present invention may be comminuted and sold as abrasive grains or cast into desired shapes for industrial uses where unusual resistance to abrasion is desired.

In accordance with the broad principles of the invention, a mixture of titania and zirconia within the mol ratios specified is submitted to the reducing action of a controlled amount of carbon. The reduction will be effected in an arc furnace although this is not a requisite of the process as the operation may be carried out in any type of furnace capable of melting the mixture. The mass which solidifies on cooling, is a dark-colored substance of cubic crystalline structure having a semi-metallic luster. The oxygen content is much greater than that found in the cyanonitrides and at least 2 per cent less in oxygen than corresponds to a mixture of unreduced dioxides. It is believed that, in the end product, a portion of the dioxide has been replaced by appreciable amounts of lower oxides. It is believed that the end product is probably a solid solution of such compounds with the dioxides.

The final reduced product is rated as very hard, on the Brinell or Rockwell scales, and 9 to somewhat below, on Mohs' scale, depending upon the ratio of titania to zirconia and upon the oxygen content. It has a specific gravity of about 5.1.

An ultimate chemical analysis of a typical product made from equi-molar quantities of titania and zirconia was as follows:

| Constituent | Weight Percent | Molar Proportions |
|---|---|---|
| Titanium | 24.5 | 1.000 |
| Zirconium | 46.7 | 1.000 |
| Oxygen | 28.1 | 3.432 |
| Carbon | 0.239 | 0.039 |
| Nitrogen | 0.337 | 0.047 |

The essential ingredients of the product appear to be zirconium, titanium and oxygen. The mol ratio of titanium to zirconium may vary within the range 1:9 to 9:1; satisfactory abrasives are obtained when the oxygen content is above 15% by weight and below 98% of that required to form dioxides of all the metallic content.

It will be found, from the analysis, that the ratio of chemical equivalents of metals to non-metals is about 2:1.80. It follows that the improved abrasive of the above analysis contains approximately 10% of free metal, or the equivalent thereof in partly reduced oxide. It is probably best considered as a solid solution of titania, zirconia, lower oxides of titanium and zirconium, and small amounts of carbon and nitrogen.

The following examples are given merely as illustrative of the principles of manufacture of the product rather than limitative of the quantities of materials to be employed.

Example 1

799 gm. of ground pigment grade titanium oxide was mixed with an equal molar quantity, 1232 gms., of a commercial grade of zirconium oxide of a fineness of about 100 mesh or finer. 24 gm. of petroleum coke was added to the mixture which was then added slowly to the crucible of an arc furnace. A power input of about 20 kilowatts was maintained in the furnace during the addition of the reacting mixture, and for five minutes after complete addition. The reactants fused as they came in contact with or against the arc. The crucible was finally allowed to cool, protected from air by a covering of an inert material, in this instance a ceramic of fused titania and zirconia. The product recovered from the crucible was an extremely hard, attrition-resistant abrasive, of semi-metallic luster.

Example 2

Like Example 1, except use 532 gm. of titanium oxide and 1643 gm. of zirconium oxide. The fusion product in this instance was withdrawn from the furnace and permitted to cool and crystallize. The end product was indistinguishable from that of Example 1.

Example 3

Like Example 1, except use 1064 gm. of titanium oxide and 822 gm. of zirconium oxide. The final product was a very dark colored crystal of extreme hardness and similar to the products of Examples 1 and 2.

Various grades of titanium dioxide, zirconium dioxide and carbon may be used in this process, and an induction furnace or other high temperature furnace may be used, provided the temperatures attained exceed 1850° C.

To show the comparative attrition resistance of the new fused reduced titania-zirconia product, pieces of it were subjected to a sand blast and the results compared with the action of the blast upon products possessing either high abrasive qualities or great hardness. The test pieces were placed two inches from the nozzle of a sand blast machine so that a flat surface was exposed to the action of the blast discharging from a one-quarter inch nozzle for periods of time as specified below. Most of the pieces were cut away to a considerable degree by the blast. The reduced titania-zirconia complex of the present invention was, however, only polished to a smooth, clean surface.

| Material | Time of Blasting In Seconds | Result |
| --- | --- | --- |
| Agate | 30 | ½″ cavity. |
| Crystalline $ZrO$ | 180 | ⅛″ cavity. |
| Electrically fused $ZrO_2$ | 180 | 3/16″ cavity. |
| Porous $TiO$ | 30 | ⅛″ cavity. |
| Stainless steel | 180 | ⅛″ cavity. |
| Titania-Zirconia complex | 180 | Polish, no erosion. |

As can be seen from the above results, the product of the present invention is extremely tough, as it is merely polished by the sand blast. A determination of the micro-hardness showed that it compared very favorably with fused corundum. The figures obtained in a set of tests on the new product gave average results of 1950 to 2100 for the diamond pyramid hardness number of different areas on the polished surface of the specimen. (Cf. N. G. Schrewelius, J. A. Cer. Soc. 31, 170, June 1, 1948, No. 6.)

The grinding properties of the new reduced titania-zirconia composition were compared to that of fused alumina by employing samples of −325 mesh powder of each for abrading spectacle crown glass on a steel lap operating at 168 R. P. M., using 8 pounds per square inch pressure, the abrasive powder being applied at the rate of 2 ml. per minute, of a slurry containing 10 gms. of powder per 100 ml. of water. The loss in weights in gram per square inch, per hour, were as follows:

| Fused Alumina | Reduced $TiO_2$–$ZrO_2$ Abrasive |
| --- | --- |
| 2.8 | 3.8 |

Under all the vigorous testing conditions, the novel fused reduced titania-zirconia composition proved to be extremely tough, hard, and abrasive-resistant, their particular qualities making the products suitable for use as abrasives or as attrition resistant materials.

What is claimed is:

1. The method of manufacturing a fused reduced titania-zirconia product which comprises heating to fusion a mixture of titanium dioxide and zirconium dioxide of composition within the mol ratio range 1:9 and 9:1 with sufficient carbon to reduce the oxygen content below 98 per cent of the original amount but not below 15 weight per cent, withdrawing the molten fusion product and permitting the same to cool and crystallize.

2. The method of manufacturing a fused reduced titania-zirconia product which comprises heating to fusion in an electric arc a mixture of titanium dioxide and zirconium dioxide of composition within the mol ratio range 1:9 and 9:1 with sufficient carbon to reduce the oxygen content below 98 per cent of its original amount but not below 15 weight per cent, withdrawing the molten fusion product from the arc and permitting the same to cool and crystallize.

3. The method of manufacturing a fused reduced titania-zirconia product which comprises heating to fusion a mixture of titanium dioxide and zirconium dioxide of compositions within the mol ratio range 1:3 and 3:1 with sufficient carbon to reduce the oxygen content to below 98 per cent of its original amount but not below 15 weight per cent, withdrawing the molten fusion product and permitting the same to cool and crystallize.

4. As a new composition of matter the product of claim 1.

5. As a new composition of matter the product of claim 3.

WARREN B. BLUMENTHAL.

References Cited in the file of this patent

UNITED STATES PATENTS

| Number | Name | Date |
| --- | --- | --- |
| 1,960,329 | Brown | May 29, 1934 |
| 2,364,123 | Benner et al. | Dec. 5, 1944 |